July 24, 1962  W. E. HANNA  3,046,367
SAFETY LOCKING DEVICES FOR AUTOMOBILES
Filed July 14, 1959
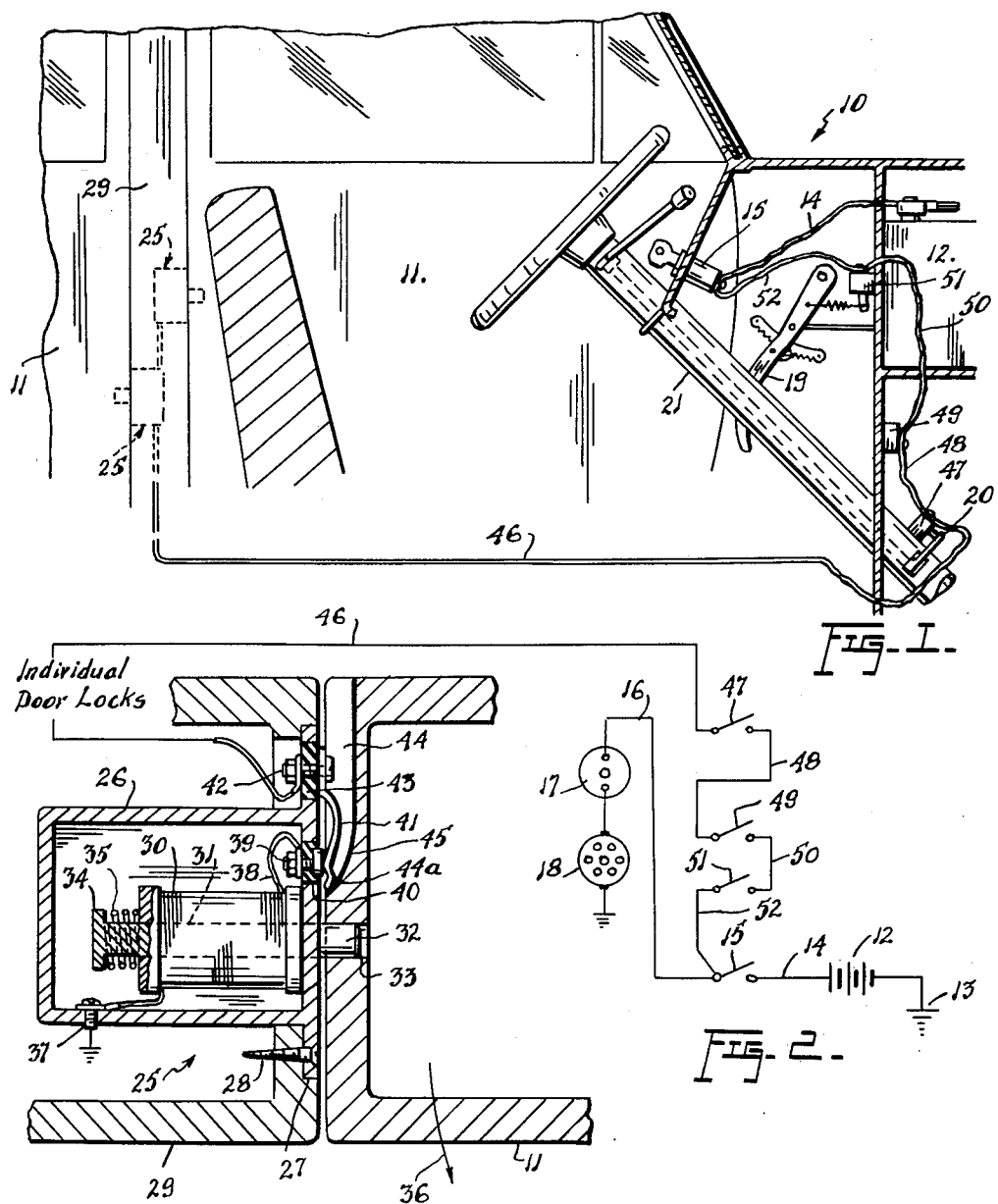
Inventor:
William E. Hanna

United States Patent Office 3,046,367
Patented July 24, 1962

3,046,367
SAFETY LOCKING DEVICES
FOR AUTOMOBILES
William E. Hanna, 13209 Silver Lane, Independence, Mo.
Filed July 14, 1959, Ser. No. 827,041
3 Claims. (Cl. 200—61.78)

This invention relates to new and useful improvements in safety door locking devices for automotive vehicles, and the principal object of the invention is to prevent doors of an automobile from being opened, either from the inside or outside, while the automobile is in operation, thus effectively safeguarding occupants of the vehicle, particularly children, against accidentally falling out and also preventing unauthorized persons from entering the automobile, as often happens while the vehicle is temporarily standing still, such as at a stop light, all this being attained automatically and incidentally to normal operation of the vehicle without the necessity of the operator to energize the door locking means which otherwise he may not do as the result of carelessness or forgetfulness.

The above object is accomplished by the provision of a safety door locking means which are operatively connected to the electrical system of the automobile and maintain the doors locked as long as the ignition switch is turned on, the emergency brake is released and the gear or transmission shift is engaged for either forward or backward travel. However, upon a reversal of any one of the above mentioned conditions, such as turning off of the ignition switch, or upon application of the emergency brake, or upon disengagement of the gear or transmission shift, the door locking means are automatically unlocked to permit opening of the doors. Moreover, the invention also contemplates the provision of an inclination responsive switch which serves to retain the locking means locked while the automobile is upright, but which automatically unlocks the doors in the event of an accident in which the vehicle falls over on its side, thereby permitting the occupants to escape or permitting persons on the outside to gain access to the interior of the vehicle and render assistance to the occupants.

Another important feature of the invention resides in the provision of means for rendering the locking device inoperative while the doors are open, so that components of the locking device are not damaged by the closing of the doors.

As such, the locking apparatus in accordance with the invention is an entity which is separate from and independent of the conventional door locking mechanism, and may be installed in vehicles of different types having any number of doors.

Some of the advantages of the invention reside in its simplicity of construction, in its efficient and dependable operation, and in its adaptability to economical manufacture and installation.

With the foregoing more important objects and features in view and such other objects and features as may become apparent as this specification proceeds, the invention will be understood from the following description taken in conjunction with the accompanying drawing, wherein like characters of reference are used to designate like parts, and wherein:

FIGURE 1 is a fragmentary sectional view of an automobile showing the invention in association with certain components thereof; and FIGURE 2 is a fragmentary sectional view, taken in a horizontal plane and on an enlarged scale, showing the door locking device in association with one of the doors as well as a wiring diagram of its electrical connections.

Referring now to the accompanying drawing in detail, the general reference numeral 10 designates an automobile or a similar automotive vehicle, including one or more doors 11 and having an electrical system including a battery 12, grounded as indicated at 13. A conductor 14 extends from the battery to an ignition switch 15 which, in turn, is connected by a conductor 16 to the ignition coil 17 and distributor 18, in the conventional manner.

The automobile also includes an emergency brake operator 19 and a gear or transmission shifting mechanism 20 associated with the steering post 21, also in the conventional manner.

The invention consists of a safety door locking device which, in FIGURE 2, is shown in association with one door of the automobile and is designated generally by the reference numeral 25. The same comprises a suitable housing 26 having flanges 27 whereby it may be secured by suitable screws 28 in the door post or frame 29 of the door 11. The housing 26 contains an electromagnet or solenoid 30 having a reciprocable armature 31, an end portion of which is projectable from and retractable in the door post or frame and constitutes a slidable locking latch or bolt 32 which, when projected, is received in an aperture or recess 33 formed in the door 11. The other end of the armature 31 is provided with an enlarged head 34 and a compression spring 35 is provided on the armature between the solenoid and the head 34, whereby to urge the bolt 32 to its retracted position and permit opening of the door in the direction of the arrow 36. The bolt 32 is projected to its locking position against the action of the spring 35 when the solenoid 30 is energized.

One end of the winding of the solenoid 30 is grounded as shown at 37, while its other end 38 is connected to a terminal screw 39 in an insulated bushing 40. The head of the screw 39 serves as a contact point for a curved, resilient switch member 41 which is secured to a terminal screw 42 in an insulated bushing 43 provided in one of the flanges 27 of the housing 26, as shown.

It will be noted that the door 11 is formed with a recess 44 to accommodate the switch member 41 and that this recess has a curved cam surface portion 44a for coaction with the free end portion of the switch member in such a manner that the switch member is in electrical contact with the terminal screw 39 when the door is closed, but becomes separated therefrom by its inherent resiliency upon opening of the door. The recess 44, including the portion 44a thereof, is provided with a liner 45 of insulating material, to prevent electrical contact of the switch member 41 with the door itself.

It will be apparent from the foregoing that the switch means 39, 41, are connected in series with the solenoid 30, so that when the door 11 is open, the switch means 39, 41 are also open and prevent energization of the solenoid which would otherwise project the bolt 32 and subject it to possible damage by the closing action of the door. On the other hand, when the door is closed, the aforementioned switch means are also closed and the solenoid is in readiness for energization in a manner now to be described.

The terminal screw 42 is connected by a suitable conductor 46 to a switch 47 which is operatively associated with the gear or transmission shifting mechanism 20 so that the switch 47 is closed when the transmission is either in forward or reverse drive, but is open when the transmission is in "neutral" or "parking" positions. The switch 47, in turn, is connected by a conductor 48 to an inclination responsive switch 49 which is mounted in any suitable position in the automobile and is normally closed when the automobile is upright, but is opened automatically when, as in the event of an accident, the vehicle is turned over on its side. The switch 49, in turn, is connected by a conductor 50 to switch 51 which is operatively associated with the emergency brake operator 19 in such manner that the switch 51 is closed when the brake is released, but is opened upon application of the brake.

Finally, the switch 51 is connected by a conductor 52 to the aforementioned ignition switch 15, it being particularly noted that all the switches 39, 41; 47; 49; 51 and 15 are connected in series with the solenoid 30 to the battery 12, whereby the solenoid cannot be energized unless all these switches are closed.

The operation of the invention will be readily apparent from the foregoing. When the vehicle is in motion, the ignition switch 15 is turned on; the emergency brake operator 19 is released; the inclination switch 49 is closed with the vehicle being in its upright position; the transmission is engaged, and the doors are closed, so that all the aforementioned switches are closed and the solenoid 30 is energized, thus causing the locking bolt 32 to be projected and keeping the doors securely locked. However, if the ignition switch is turned off, or the emergency brake applied; or the transmission disengaged; or the inclination switch 49 opened by the vehicle turning over on its side, the opening of any one of the aforementioned switches will automatically deenergize the solenoid 30 and permit the bolt 32 to unlock the doors by the action of the spring 35. Thus, the driver of the vehicle may, for example, keep the engine running but permit opening of the doors by application of the emergency brake or by disengagement of the transmission, or he may stop the engine and permit opening of the doors without disengaging the transmission or applying the brake. However, it is to be noted that as long as the vehicle is running under normal conditions, the doors will remain securely locked, thus protecting the occupants against accidental falling out and also preventing unauthorized persons on the outside of the vehicle from entering.

As already noted, in the event of an accidental turning over of the automobile, the opening of the switch 49 will automatically permit opening of the doors so that the occupants may escape or so that persons on the outside may enter the vehicle and render assistance to the occupants. Also, the switch means 39, 41 will prevent energization of the solenoid 30 as long as the door 11 is open, even when all the other switches in the circuit are closed, thus protecting the bolt 32 against damage by subsequent closing of the door.

In instances where the vehicle is equipped with two or more doors, a separate locking device 25 is provided for each individual door and the several locking units are connected together, either in series or in parallel and, as such, are connected in series with the switches 47, 49, 51 and 15, as already described.

While in the foregoing there has been described and shown the preferred embodiment of the invention, various modifications may become apparent to those skilled in the art to which the invention relates. Accordingly, it is not desired to limit the invention to this disclosure, and various modifications may be resorted to, such as may lie within the spirit and scope of the appended claims.

What is claimed as new is:

1. In combination with a vehicle door frame and a cooperating swingable door, said door having a hinged side and a free outer side and also having inner and outer surfaces and an outer side edge swingable into an opposing relation to said frame when the door is closed, the outer side edge of said door being provided with an elongated recess open at the inner surface of the door and extending outwardly therefrom, said recess having a curved cam surfaced end terminating in the plane of said outer side edge at a point spaced inwardly from the outer surface of the door, and a door-actuated electric switch comprising an elongated resilient strip-like switch member accommodated longitudinally in said recess when the door is closed, said switch member having an inner end secured to said door frame and a free outer end, and an insulated switch contact provided on the door frame and engageable by the free outer end of said switch member, said free outer end of the switch member engaging said cam surfaced end of said recess during closing of the door whereby to urge the same into engagement with said switch contact.

2. The device as defined in claim 1 together with a liner of insulating material provided in said recess of the door.

3. The device as defined in claim 1 together with an insulated switch terminal provided on said door frame and securing said inner end of said switch member thereto.

References Cited in the file of this patent

UNITED STATES PATENTS

| | | |
|---|---|---|
| 1,052,488 | Legrand et al | Feb. 11, 1913 |
| 1,303,876 | Francis | May 20, 1919 |
| 1,326,380 | Veigel | Dec. 30, 1919 |
| 2,031,344 | Thomasma | Feb. 18, 1936 |
| 2,519,197 | Preston | Aug. 15, 1950 |
| 2,672,943 | Chatlynee et al. | Mar. 23, 1954 |
| 2,674,334 | Uberbacher | Apr. 6, 1954 |
| 2,717,169 | Lindbloom | Sept. 6, 1955 |
| 2,941,614 | Forbush et al. | June 21, 1960 |